United States Patent [19]
Harstead

[11] 4,175,005
[45] Nov. 20, 1979

[54] COMPONENT NUCLEAR CONTAINMENT STRUCTURE

[76] Inventor: Gunnar A. Harstead, 240 Ellin Dr., Park Ridge, N.J. 07656

[21] Appl. No.: 856,906

[22] Filed: Dec. 2, 1977

Related U.S. Application Data

[63] Continuation of Ser. No. 638,318, Dec. 6, 1975, abandoned.

[51] Int. Cl.² ............................................. G21C 13/08
[52] U.S. Cl. ......................................... 176/87; 176/38; 176/DIG. 2
[58] Field of Search ...................... 176/38, 87, DIG. 2

[56] References Cited

U.S. PATENT DOCUMENTS

| | | | |
|---|---|---|---|
| 3,414,472 | 12/1968 | Chave | 176/38 X |
| 3,644,172 | 2/1972 | Campbell | 176/38 X |
| 3,666,616 | 5/1972 | Schluderberg | 176/37 |
| 3,775,251 | 11/1973 | Schabert | 176/87 |
| 3,844,885 | 10/1974 | Weems et al. | 176/37 |
| 3,899,391 | 8/1975 | Sulzer | 176/87 X |
| 3,990,941 | 11/1976 | Scholz | 176/87 |
| 4,022,656 | 5/1977 | Durston et al. | 176/87 |

OTHER PUBLICATIONS

Int'l A.E.A., Directory of Nuclear Reactors, vol. II, Int'l A.E.A., pp. 199–203.

Int'l A.E.A., Directory of Nuclear Reactors, vol. II, Int'l A.E.A., Kartner Ring, Vienna I, Austria, 1959, p. 72.

Primary Examiner—Peter A. Nelson

[57] ABSTRACT

The invention described herein is intended for use primarily as a nuclear containment structure. Such structures are required to surround the nuclear steam supply system and to contain the effects of breaks in the nuclear steam supply system, or i.e. loss of coolant accidents. Nuclear containment structures are required to withstand internal pressure and temperatures which result from loss of coolant accidents, and to provide for radiation shielding during operation and during the loss of coolant accident, as well as to resist all other applied loads, such as earthquakes. The nuclear containment structure described herein is a composite nuclear containment structure, and is one which structurally combines two previous systems; namely, a steel vessel, and a lined concrete structure.

Whereas the steel vessel provides strength to resist internal pressure and accommodate temperature increases, the lined concrete structure provides resistance to internal pressure by having a liner which will prevent leakage, and which is in contact with the concrete structure which provides the strength to resist the pressure.

9 Claims, 2 Drawing Figures

COMPONENT NUCLEAR CONTAINMENT STRUCTURE

This is a continuation of application Ser. No. 638,318, filed Dec. 6, 1975, and now abandoned.

BACKGROUND OF THE INVENTION

When a steel vessel is used for containment, a separate concrete structure is required to provide radiation shielding. This separate structure therefore cannot provide resistance to internal pressure, but must carry inertial seismic loads caused by the earthquake.

When a lined concrete structure is used for containment, the liner, which is usually steel, has no significant strength to resist internal pressure loads, and has not been considered to be effective in resisting membrane shear stresses. The concrete structure is usually designed to resist all significant applied loads.

For the composite nuclear containment structure, a concrete structure is placed in intimate contact with, and is connected to a steel vessel. The composite structure may be proportioned so that both the concrete structure and steel vessels act together in resisting all applied loads. Since both essential components of the composite nuclear containment structure act, each structure need not have the strength required of an independent structure. This provides for a design for which the thickness of the steel vessel can be kept below that thickness requiring complex welding procedures and the concrete structure need not have the quantity of reinforcing bars or prestrung tendons required for the usual concrete containment structure.

In addition to the enhanced strength of a composite nuclear containment structure with lesser quantities of materials than usually required, construction procedures may be employed which are much less costly and time consuming than those previously required for either the steel vessel or the lined concrete structure. The composite nuclear containment may be constructed such that the steel vessel provides support for an interior crane prior to concrete placement, and provides support for winches which are used to place reinforcing bars and tendons. These winches can be used for slip forming during concrete placement and the steel vessel acts as an interior concrete form without the need for extensive temporary or permanent stiffening.

This invention relates, in general, to nuclear energy containment systems, and more particularly, to a combination of structural materials which reduce quantities of materials or stresses or both, and will permit techniques which will facilitate construction.

Nuclear steam generating systems are contained within a containment structural system, which must be capable of resisting internal pressure and temperature increases caused by the Design Basis Accident (effects of an assumed loss of coolant accident) in combination with other loading requirements. The system must also be capable of providing radiation shielding during the entire life of the nuclear steam generating system, including the Design Basis Accident. These requirements have been met heretofore in several ways. One method is the application of steel containment supported by a foundation mat which serves to provide leak tightness and resist the internal pressure. A concrete structure, separated from the steel vessel, usually surrounds the steel vessel in order to provide radiation shielding and protection for the steel vessel against the effects of tornadoes and other external loadings. This outer concrete structure is usually supported on the same foundation mat as the steel vessel. During the Design Basis Accident, the steel vessel expands as it is subjected to internal pressure and temperature increases. Because of the space provided between the steel vessel and outer concrete structure is not significantly affected by the Design Basis Accident. However, both structures must be capable of withstanding seismic loads which may be assumed to be coincident with Design Basis Accidents. Another method consists of a concrete structure which provides the primary structural resistance to all imposed loads. The interior of the concrete structure is lined with a membrane, usually metallic, in order to provide resistance to leakage. During a Design Basis Accident, pressure load is passed to the concrete structure which is usually reinforced with steel bars, or prestressed by means of tendons, or a combination of both. As the liner is heated during the Design Basis Accident, it is constrained by the structural concrete which carries the pressure load. Because of this constraint, the liner, especially a metallic liner, will develop either low tensile mechanical strains, or in fact, compressive mechanical strains. The development of compressive mechanical strains during the Design Basis Accident is particularly evident in prestressed concrete containments. The development of high compressive mechanical strains, and hence compressive forces in the liner will be balanced by corresponding tensile forces in the surrounding concrete structure. Therefore, the liner, while providing leakage resistance, may impose additional loads upon the concrete structure containing embedded reinforcing bars and/or prestressing tendons. For reasons of economics, the liners have been selected as thin as practical consistent with requirements of construction. In most applications, the liners range from about $\frac{1}{4}''$ to $\frac{1}{2}''$ in thickness.

U.S. Pat. No. 3,605,362 issued Sept. 20, 1971 to E. A. Sweeney and assigned to Stone and Webster Engineering Corporation, describes structural assemblies which reduces discontinuity stresses, and was considered to be especially suitable for reinforced concrete nuclear power reactor containment wall connecting to the supporting mat. An inside liner covers the interior of the walls and dome as well as the top of the supporting mat.

U.S. Pat. No. 3,444,725 issued on May 20, 1969 to C. T. Chave and assigned to Stone and Webster Engineering Corporation, describes a nuclear containment system consisting of an inner and outer containment structure in which the annular space between the two structures is used for a leak detection system.

U.S. Pat. No. 3,725,198 issued on Apr. 3, 1973 to G. A. Harstead, et al, and assigned to Westinghouse Electric Corporation, discloses a system which consists of an inner and outer structure supported on a common foundation mat, the space between the two structures being filled with a fluid.

While the aforementioned containment systems satisfy the requirements of containment, they usually require either a dual structural system or a concrete structure with a metal liner which contributes, at best, little to the overall structural resistance capability of the nuclear containment system.

Each structure of the dual system must be capable of withstanding independently the considerable loads to which it may be subjected. On the other hand, the metal lined concrete structure will be subjected to high stresses at discontinuities caused by internal pressure, and the previously described thermal effects of the liner, during the Design Basis Accident in addition to the general loading imposed by internal pressure thermal effects, seismic inertial loads, tornado effect, etc., the metal liner offering little to structural capability.

SUMMARY OF THE INVENTION

It is, therefore, an object of this invention to provide for a structure which will reduce the effects of discontinuities, and in general, reduce the strength requirement in the concrete, i.e., reduce reinforcing bars and prestressing tendons.

It is a particular object of the present invention to reduce the number of tendons and their anchorages and in associated reinforcement as well as reinforcing bars at discontinuities in the case of prestressed concrete. Furthermore, it is a particular objective of the present invention to reduce the quantity of reinforcing bars in reinforced concrete structures required to resist membrane forces caused by pressure and temperature effects, seismic ground motions, tornadoes, etc. It is also an objective to reduce the quantity of reinforcing bars and to simplify the arrangements of reinforcing bars and/or tendons at discontinuities.

Another object of this invention is to provide for a new and improved structural system which will simplify construction of the containment by providing for a metal vessel substantially thicker than liners used with concrete containments, and by reducing congestion of reinforcing bars and tendons within concrete.

Briefly described, the present invention relates to a unique combination of structural elements, in order to permit increased participation of all elements of the system in resisting loads and to facilitate construction and reduced duration of construction.

The sealed containment system consists of a steel vessel which is sized to carry all, or at least a significant portion of the imposed loads, and to eliminate the need for post weld heat treatment or other costly and time consuming erection techniques. Surrounding, and in contact with the steel vessel, concrete is placed which provides for radiation shielding, and which participates with the steel vessel in carrying loads through composite structural behavior.

The fact that the steel vessel of the present invention is substantially thicker than the steel liner of a typical concrete containment structure, and the fact that the reinforcing bars and/or tendons required is much less than that required in a concrete structure results in a major difference in the relative stiffness when the present invention is compared to the concrete containment structure. The relative stiffness of the steel vessel and the surrounding concrete results in the following beneficial and unique behavior:

(a) Growth of the steel vessel in order to accomodate temperature increases which can occur without development of large tensile forces in the less stiff surrounding reinforced or prestressed concrete.

(b) Because thermal growth of the steel vessel is accommodated, the steel vessel can participate in carrying primary loads, and accommodate without high stresses, the effects of geometrical constraints.

(c) Because the steel vessel can carry substantial loads, the surrounding concrete can be reinforced or prestressed to a much lesser degree than in a typical reinforced or prestressed concrete containment structure.

(d) Because of the lesser prestressing or reinforcement, and hence lesser stiffness in the surrounding concrete when compared to a typical reinforced or prestressed concrete containment structure, the primary forces developed in the surrounding concrete of the present invention will be much less than those developed in typical reinforced or prestressed concrete containment structures.

(e) Because the steel vessel becomes the major load resisting element, there is little or no need to provide bending and radial shear resistance in surrounding concrete structure. This results in an elimination of discontinuity stresses without the need for the connection system for relieving stress in concrete structures disclosed in U.S. Pat. No. 3,605,362 cited above.

(f) Because of reduced quantities of reinforcing bars or prestressing tendons, the thickness of the concrete surrounding the steel vessel may be less than that usually required in concrete containment structures. This reduced thickness also reduces inertial forces resulting from seismic ground motions.

(g) The extensive anchorage system necessary to tie the liner to the concrete is reduced when compared to conventional reinforced or prestressed concrete containment structures. The steel vessel has sufficient thickness so that the following erection methods may be employed:

(a) The vessel is erected without the need for extensive temporary and permanent bracing required of steel liners.

(b) The steel vessel may be used as a form for placement of concrete with greatly reduced stiffening and shoring required to preclude buckling and deformation of a steel liner due to the concrete dead weight and hydrostatic pressures which develop prior to hardening the concrete.

(c) The steel vessel may be used to support an interior crane to facilitate construction inside of containment without waiting for the concrete construction to proceed to the support level of the crane or the extensive stiffening of the metal liner.

(d) The steel vessel may be used to support winches and thereby eliminate the need for high capacity cranes required for reinforcing bar or tendon duct placement forming operations, and concrete placement.

For a better understanding of the invention, reference may be had to the accompanying drawings in which:

FIG. 1 shows an elevational cross-section view of a reactor containment system in accordance with this invention; and, FIG. 2 shows a sectional view along lines I—I of FIG. 1.

DESCRIPTION OF THE PREFERRED EMBODIMENT

Figure 1:
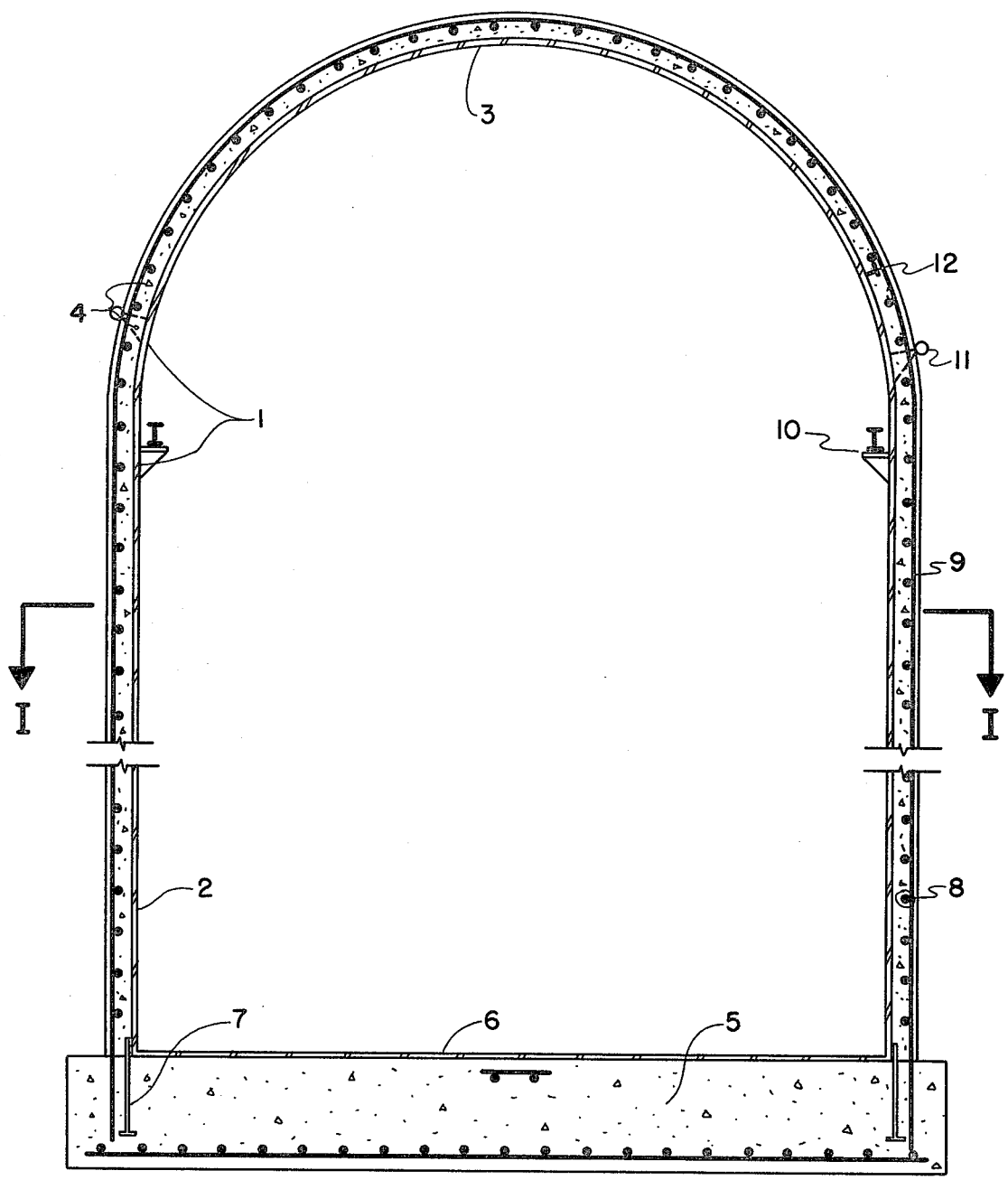
Figure 2:
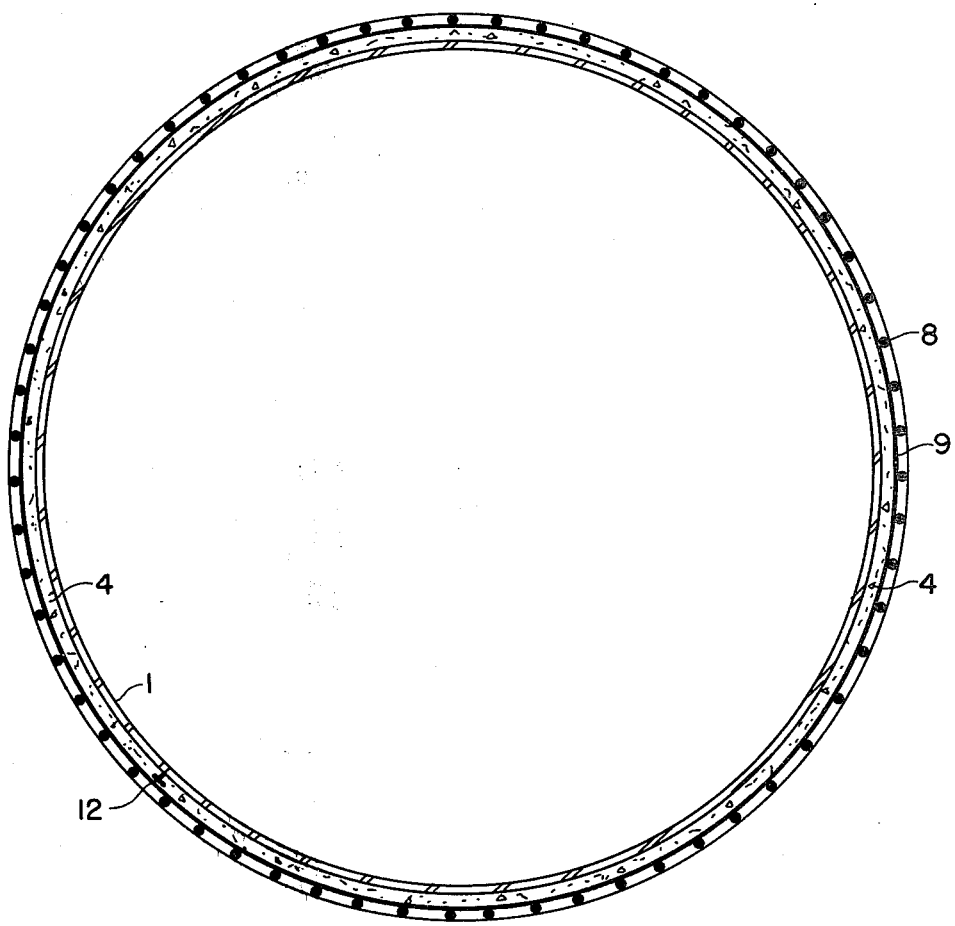

Referring now to FIGS. 1 and 2 of the drawing, an example of composite containment which may enclose nuclear steam supply system is depicted therein. The containment system consists of a steel vessel 1 composed of a cylinder 2 and a top dome 3. Surrounding this steel vessel is concrete 4 of sufficient thickness to provide for radiation shielding and imposed loadings consistent with constructability. This structure is supported on a steel lined foundation mat 5. The steel lining 6 on the foundation mat and the steel vessel provide the major resistance to potential leakage. A viable alternate to a steel lined foundation mat is a dished steel base which then provides for a complete steel vessel. The dished steel base carrying the forces similarly to a vessel head and would in turn be supported by a concrete mat. In the case of a steel lined concrete mat, an anchorage 7 of the cylinder 2 of steel vessel to the foundation mat 5 is required to transfer meridional membrane forces and membrane shear forces from the steel vessel 1 to the foundation mat 5.

Hoop reinforcing bars or hoop prestressing tendons 8 are provided to participate with the cylindrical portion of the steel vessel 2 in carrying hoop membrane forces. Vertical re-bar 9 is provided for crack control and additional vertical reinforcing bars may be provided to participate with the cylindrical portion of the steel vessel in carrying meridional membrane forces. While this added vertical reinforcement will be in general needed, structural steel plates and shapes 12 may be welded to the steel vessel where it may be required.

A support for a polar crane 10 is attached to and supported by the cylinder 2 of the steel vessel 1 prior to the time at which concrete placement has arrived at the elevation of crane. After concrete has been placed to that level, it provides additional stiffness and support for the crane during possible loadings.

Temporary winches 11 may be placed at convenient locations after the steel vessel has been erected. These winches, supported by the steel vessel 1, are used to hoist hoop re-bars into place as well as other reinforcing appurtenances, and formwork. The winches may also be used to pull slip forms. Since the steel vessel serves as the inner form, the slip form is only required to form the outer surface of the concrete.

The unique combination of structural elements, i.e., the composite construction of the steel vessel 1 surrounded by, in contact with, and anchored as required to the concrete results in a structural response which substantially reduces material requirements and construction time.

It should be noted that the present invention has utility in any application wherein a vessel is subject to internal pressure.

While there has been shown and described what is at present considered the preferred embodiment of the invention, modifications thereto will readily occur to those skilled in the art. In particular as indicated, a dished bottom steel vessel head may be used in lieu of the lined concrete foundation mat. It is not desired, therefore, that the invention be limited to the specific arrangement shown and described, and it is intended to cover in the appended claims all such modification to fall within the true spirit and scope of the invention.

I claim:

1. A nuclear reactor containment comprising:
   a self-supporting, inner, structural steel, shell-like vessel with curved side walls and top walls having a wall thickness sufficient to enable said steel vessel alone to carry a major portion of the total load imposed on the containment, and, furthermore, sufficient to withstand construction loads imposed upon said vessel during placement of reinforcing and concrete surrounding said vessel,
   an outer reinforced concrete vessel surrounding and in direct contact with the steel vessel and carrying the remaining portion of the imposed load,
   and a foundation mat, said steel vessel and concrete vessel being supported on said foundation mat,
   said steel vessel and said concrete vessel acting together as a composite structure in resisting all applied loads.

2. A nuclear reactor containment as claimed in claim 1 wherein the top walls of the vessel have the same thickness as the side walls.

3. A nuclear reactor containment as claimed in claim 1 wherein the wall thickness of the vessel side walls exceeds one-half inch.

4. A nuclear reactor containment as claimed in claim 1, further comprising structural steel members secured to the steel vessel and embedded in the concrete vessel.

5. A nuclear reactor containment as claimed in claim 4, wherein reinforcing bars are mounted to the concrete to reinforce same.

6. A nuclear reactor containment as claimed in claim 4, wherein prestressed tendons are mounted to the concrete to reinforce same.

7. A nuclear reactor containment as claimed in claim 1, further comprising means mounted on the steel vessel to support an interior crane.

8. A nuclear reactor containment as claimed in claim 1, further comprising means mounted on the steel vessel to support exterior winches thereon.

9. A nuclear reactor containment as claimed in claim 6, wherein said steel vessel is of sufficient strength to serve as a form during fabrication of the surrounding concrete vessel.

* * * * *